Feb. 20, 1962

W. E. DICKINSON 3,022,005

SYSTEM FOR COMPARING INFORMATION ITEMS TO
DETERMINE SIMILARITY THEREBETWEEN

Filed Jan. 12, 1959

INVENTOR.
WESLEY E. DICKINSON

BY

*Richard C. Cummins*

ATTORNEY

Feb. 20, 1962 W. E. DICKINSON 3,022,005
SYSTEM FOR COMPARING INFORMATION ITEMS TO
DETERMINE SIMILARITY THEREBETWEEN
Filed Jan. 12, 1959 2 Sheets-Sheet 2

United States Patent Office 3,022,005
Patented Feb. 20, 1962

3,022,005
SYSTEM FOR COMPARING INFORMATION ITEMS TO DETERMINE SIMILARITY THEREBETWEEN
Wesley E. Dickinson, County of Santa Clara, Calif., assignor to International Business Machines Corporation, New York, N.Y., a corporation of New York
Filed Jan. 12, 1959, Ser. No. 786,254
7 Claims. (Cl. 235—152)

This invention relates in general to comparison systems and in particular to a system for comparing an unknown quantity of information with a library of known quantities for selecting those quantities which have a predetermined degree of similarity to the unknown quantity. The invention has particular utility in processing information which may be represented either graphically or by an $n$-dimensional vector representation.

Many applications exist where it is desirable to compare one quantity, which is defined by a large number of parameters, with known quantities defined by similar parameters. One such application exists in the field of spectrum analysis wherein identification of an element present in a sample of an unknown compound may be accomplished by comparing the spectrum of the unknown with each of the known spectra since each element has a characteristic spectrum. Because of the relatively large number of known elements, the library of their spectra is quite large. In addition, since the spectrum of each element is defined by a relatively large number of parameters it is quite impractical to make a manual comparison of an unknown spectrum with each known spectrum.

Various attempts have been made in the past to mechanize this manual comparison operation. In one known arrangement standard 80-column accounting cards are employed for storing the parameters which define the spectrum of the known elements, each column of a card corresponding to a particular wavelength of the spectrum and the rows designating the amplitude of light transmitted by the particular element at the respective wavelengths. In order to compare an unknown spectrum with the library of known spectra, the cards are sorted by a conventional accounting card sorter column by column in accordance with the various parameters of the unknown spectrum. In some instances, it is possible to eliminate sorting many columns; however, because of the quantity of cards and the number of columns which must be considered, each comparison operation still requires considerable time.

It will be seen that this type of "sort to compare" operation involves a one-to-one comparison which, in many applications, is not always necessary and at times is not desired. For example, in spectrum analysis it is more desirable to have a comparison operation which is based on the "goodness of fit" concept, as distinguished from a direct or one-to-one correspondence of parameters. It is of course possible to achieve the effect of a "goodness of fit" sorting approach by conventional sorting apparatus, but this increases the time required for each comparing operation as the degree of correspondence desired becomes less.

It has been found in accordance with the present invention that a comparison system may be provided in which an unknown multi-parameter quantity may be compared with a library of similarly defined quantities to determine, in a single scan through the library, those quantities which have a predetermined selectable degree of correspondence to the unknown quantity.

The system of the invention comprises generally a library having a plurality of unit records corresponding to known quantities, each of which may be defined by a plurality of parameters, each record having means for storing digital representations corresponding to each of the parameters. Means are provided for converting digital representations of a parameter to a corresponding analog voltage level. Means are also provided for weighting each of these analog voltage levels in accordance with a value predetermined by the corresponding parameter of the unknown quantity, these weighted voltages being summed and applied to one input terminal of a differential amplifier.

The system further includes means for generating a first control voltage corresponding to the square root of the sum of the digital representations stored on the record and means for weighting this control voltage in accordance with the square root of the sum of the squares of the predetermined weighted values of the unknown quantity. The weighted control voltage is applied to the other terminal of the differential amplifier. The output voltage of the differential amplifier will be at a maximum when the input voltages are equal. Stated somewhat differently, the output voltage will be at a maximum when each of the parameters of the unknown quantity corresponds respectively to each parameter of one of the records in the library. In addition, the output voltage will also be at a maximum when the respective parameters have the same proportion. A level sensing device is provided to determine when the output voltage of the differential amplifier reaches a predetermined level so that an indicating signal may be generated. In order that unit records having parameters not precisely the same as the unknown parameters may also provide an indicating signal in accordance with some predetermined desired degree of correspondence, means are further provided for effecting the weighted control voltage applied to the differential amplifier.

Summarily, the system may be considered a mechanization of the equation:

$$R = \frac{D_0W_0 + D_1W_1 + D_2W_2 + \ldots D_nW_n}{K\sqrt{(D_0^2 + D_1^2 + D_2^2 + \ldots D_n^2)(W_0^2 + W_1^2 + W_2^2 + \ldots W_n^2)}} \quad (1)$$

where D is the amplitude of a particular parameter of a known spectrum, W is the amplitude of the corresponding parameters of the unknown, and K is the degree of correspondence factor, D being represented by a voltage value and W by a conductance value. R is the correlation coefficient between the known spectrum and the unknown spectrum and ranges between 0 and 1 where 1 represents perfect correlation.

It is therefore an object of the present invention to provide an improved system for comparing quantities having a plurality of parameters.

Another object of the present invention is to provide an improved comparison system in which the degree of comparison desired may be varied.

A further object of the present invention is to provide a comparison system in which an unknown quantity which is defined by a plurality of parameters may be compared with a library of known quantities defined by similar parameters to determine in a single scan operation the known quantities which have a predetermined degree of correspondence to the unknown quantity.

Other objects of the invention will be pointed out in the following description and claims and illustrated in the accompanying drawings which disclose, by way of example, the principle of the invention and the best mode which has been contemplated of applying that principle.

Figure 1:
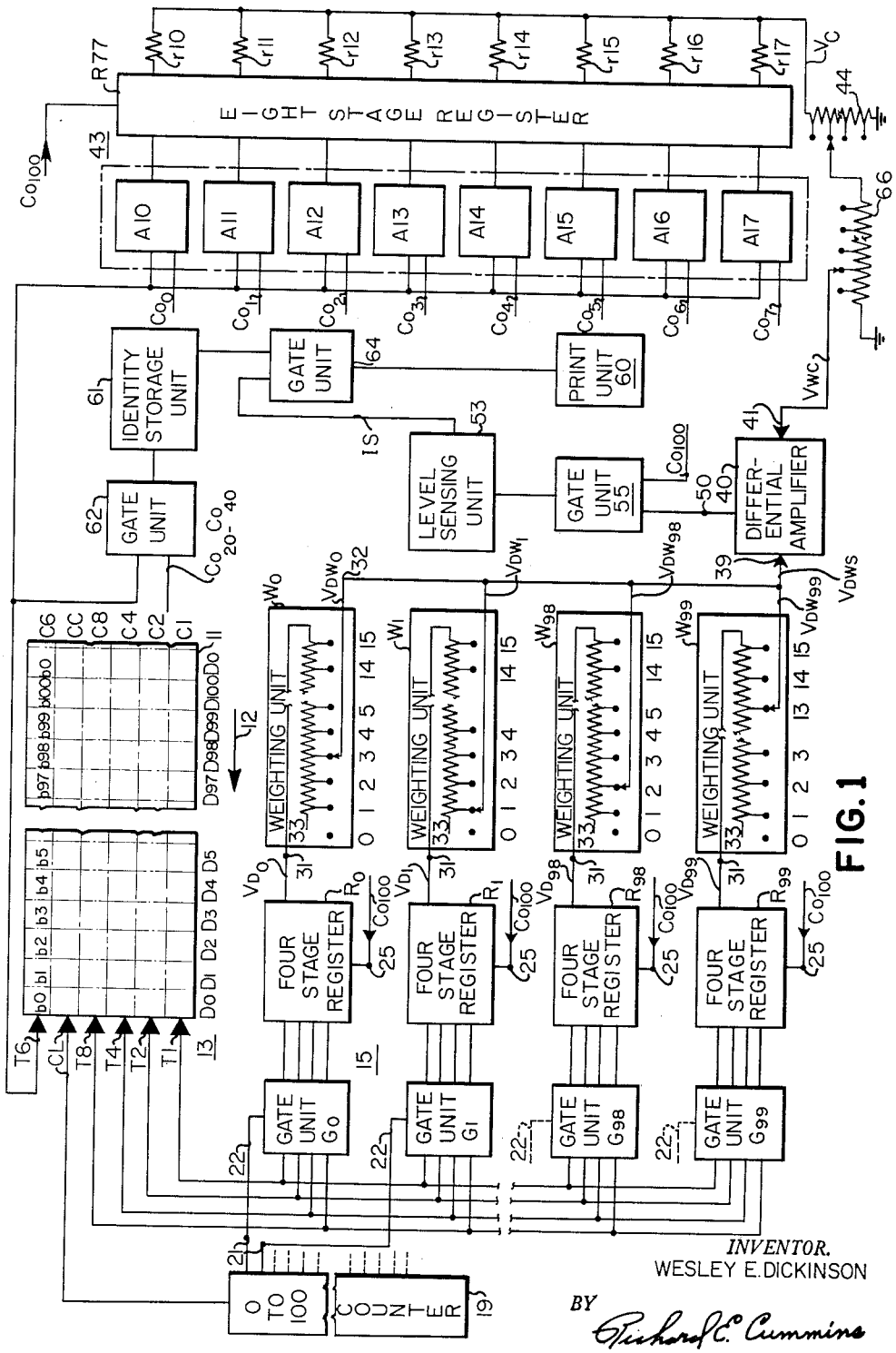
FIG. 1 is a diagrammatic view of a comparison system embodying the present invention.

Referring to the drawings and particularly to FIG. 1, the comparison system illustrated therein is adapted to compare the spectrum of an unknown element against a library of known spectra to determine those elements which have a desired degree of correspondence to the unknown element. It should be noted that while the system of the present invention is explained in terms of a spectrum analysis application, various other applications exist wherein quantities to be compared may be defined by a plurality of parameters. In general, quantities suitably represented in either graphical form or by an $n$-dimensional vector representation may be compared by the present system.

Figure 2:
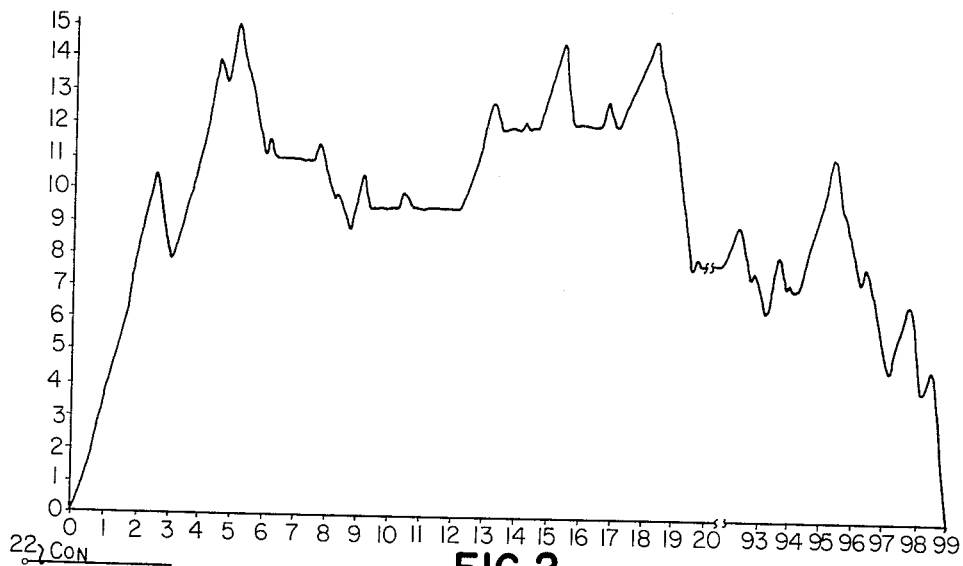
FIG. 2 is a graph illustrating the spectrum of an unknown element.

FIG. 2 represents the spectrum of an unknown element in graphical form, the wavelength of the light in angstroms being plotted along the horizontal or $x$ axis and the amplitude of the light transmitted thereby being plotted along the vertical or $y$ axis. Since each known element has a particular characteristic spectrum, the unknown element may be identified by comparing its spectrum with a library of spectra of known elements. The library comprises a plurality of unit records, each of which corresponds to a known element. Such a library may contain 10,000 or more unit records. The spectra of nearly all elements may be defined quite accurately by considering the response of the element at a relatively large number of wavelengths. In the present example the spectra are defined by 100 sample points which are referred to as "descriptors" D and correspond to preselected wavelengths spaced substantially equally throughout the total spectrum.

As shown diagrammatically in FIG. 1, the library in this instance is recorded on a 6-channel magnetic tape 11 which is movable in the direction of arrow 12 past a reading station 13. The 100 descriptors $D_0$–$D_{99}$ which define the spectrum of the element are recorded serially on the tape 11, each descriptor D being recorded as a binary coded number. For purposes of explanation it is assumed that each descriptor D can vary from 0 to 15 units and hence, each descriptor is recorded in binary code in parallel on the first four channels designated C1, C2, C4 and C8 of the magnetic tape. The 100 descriptors designated $D_0$ through $D_{99}$ which comprises the record being compared are therefore scanned serially by the read station 13. The tape unit 11 serves as one type of library means for magnetically storing each known quantity in terms of its descriptors in the form of binary coded representations. However, it should be obvious that other types of storage may be employed if desired.

The system further includes means 15 for converting each descriptor $D_n$ to a corresponding analog voltage $V_{Dn}$. In the illustrated embodiment, this means comprises a plurality of magnetic transducers T1, T2, T4 and T8 adapted to scan channels C1, C2, C4 and C8 of the tape 11, a plurality of 4-stage registers $R_0$ through $R_{99}$ and a plurality of gate units $G_0$ through $G_{99}$. The four input terminals of the registers R are connected to the transducers T1, T2, T4 and T8 in parallel through respective gating units $G_0$ through $G_{99}$. A counter or sequencer 19 is also provided to operate the gate units G in succession. The counter, as shown, operates in response to a clock signal generated by means of transducer CL scanning a suitably recorded clock channel designated CC on tape 11 so that the digital representations of each descriptor D are transferred to the appropriate register R in succession. Since any suitable counter capable of counting from 0 to 100 may be employed for counter 19, it would not appear necessary to explain in detail its structure and operation. Reference may be had to many of the standard texts on computers for further details.

Figure 3:
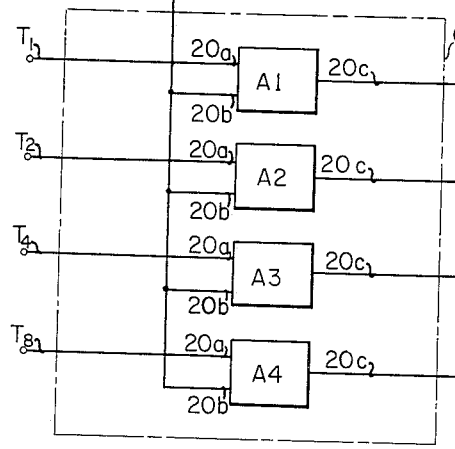
FIGS. 3 through 5 are schematic views of the various components of the system shown diagrammatically in FIG. 1.

The gate units $G_0$ through $G_{99}$ are all identical and hence only one is shown in detail in FIG. 3. Each gate unit G comprises four conventional AND gates A1 through A4. Each AND gate has a pair of input terminals 20a and 20b and an output terminal 20c. One terminal 20a of each AND gate is connected to a different one of the transducers T1 through T8, the remaining four terminals 20b of the AND gates being connected to the appropriate output tap 21 of the counter 19 by means of a line 22.

Figure 4:
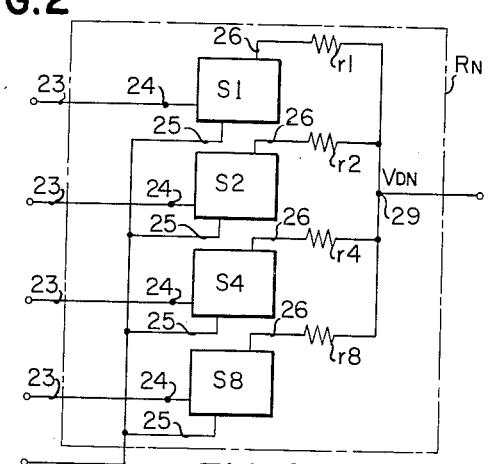

The output taps 20c of the AND gates A1 through A4 are connected respectively to the four input lines 23 of the associated register R. Each of the registers is similar, so only one is shown in detail in FIG. 4. Each register comprises four stages designated S1, S2, S4 and S8. Any suitable bi-stable device may be employed to function as one stage of the register, such as a conventional flip-flop circuit having an input terminal 24, a reset terminal 25 and an output terminal 26. It is assumed that a pulse supplied to the input terminal 24 changes the level of the output voltage at terminal 26 from a low state to a high state and that a pulse applied to the reset terminal 25 causes the voltage of the output terminal 26 to return to a low state.

The output terminals 26 of the four stages S1, S2, S4 and S8, are connected in parallel through resistors $r1$ through $r4$. The values of each of these resistors $r$ are selected so that 16 separate equally spaced voltage levels $V_D$ may be obtained at junction point 29 depending on the state of the four stages S of register R. It will thus be seen that the voltage $V_{Dn}$ at point 29 is an analog voltage representation of the corresponding descriptor $D_n$ and the portion of the system described so far merely functions to convert a digital representation of a descriptor $D_n$ to an analog voltage $V_{Dn}$.

The system further comprises a plurality of weighting units W, $W_0$ through $W_{99}$, each of which is similar, and hence only one is described. The weighting unit $W_0$ comprises an input terminal 31, an output terminal 32 and a variable resistor unit 33 connected therebetween, having 16 separate positions designated 0 through 15 each of which may be selected individually.

Since the input voltage $V_{Dn}$ to weighting unit $W_n$ may vary also from 0 to 15 voltage levels, the output voltage $V_{DWn}$ of the weighting unit $W_n$ may obtain any one of 225 different equally spaced voltage values or levels.

The output terminal 32 of each of the weighting units is connected in parallel to one input terminal 39 of the differential amplifier 40. The voltages $V_{DWS}$ applied to input terminal 39 of the differential amplifier 40 represent the sum of the weighted analog voltages $V_{DW0}$ through $V_{DW99}$ and corresponds to the numerator of Equation 1 referred to earlier.

The other terminal 41 of the differential amplifier 40 is supplied with a weighted control voltage $V_{WC}$ proportional to the denominator of Equation 1. This weighted control voltage may be generated in any suitable manner. For example, if the denominator of the equation is written as:

$$K\sqrt{D_0^2+D_1^2+D_2^2+D_3^2} \ldots \times \sqrt{W_0^2+W_1^2+W_2^2+W_3^2} \ldots$$

it will be seen that it is possible to predetermine the factor under the first radical for each unit record and record it on an additional channel of the tape in the form of binary coded indicia for subsequent conversion to an analog control voltage $V_C$. Since the maximum value $D^2$ can obtain is 22,500, the square root will not exceed 150 which may be represented by eight binary coded bits. The digital representation of the first portion of the denominator is recorded in the first eight bit spaces $b_0$ through $b_7$ of channel C6. The remaining bit spaces of channel C6 may be employed for recording other information such as the identity of the particular unit record as explained later in the specification. The means 43 for converting the digital representation of the factor $$\sqrt{D_0^2 + D_1^2 + D_2^2 + D_3^2} \ldots$$

to an analog control voltage $V_C$ is similar to the means 15 employed in converting the digital representations of the descriptors D to analog voltages $V_D$. As shown, means 43 comprises transducer T6 connected to an eight-stage register $R_{77}$ through AND gates A10 through A17. The AND gates are opened in succession by the first eight pulses $CO_0$ through $CO_7$ supplied by counter 19. The recorded digital representation is transferred to the eight stages of the register $R_{77}$. Each output stage of the register $R_{77}$ is connected in parallel through suitable weighting resistors $r10$ through $r17$. The voltage $V_C$ is therefore proportional to the first part of the denominator.

The second portion of the denominator, namely, $$\sqrt{W_0^2 + W_1^2 + W_2^2 + \ldots W_n^2}$$

may also be predetermined since each of the values $W_0$ through $W_{99}$ is known prior to a comparison operation, $W_n$ being the amplitude from 0 to 15 of the descriptor $D_n$ corresponding to a preassigned wavelength in the spectrum of the unknown quantity. A weighted voltage $V_{WC}$ proportional to the denominator of Equation 1 may therefore be obtained by weighting the output voltage $V_C$ supplied by means 43 with a conductance factor proportional to $$\sqrt{W_0^2 + W_1^2 + W_2^2 \ldots W_n^2}$$

A potentiometer 44 connected between the output terminal of the converting means 43 and the input terminal 41 of the differential amplifier 40 functions to perform this weighting of voltage $V_C$ by having 150 equal steps corresponding to 150 different values of conductance.

It can be shown mathematically that Equation 1 is a maximum value of unity when there is a direct match of $D_n$ and $W_n$ for each of the parameters. Stated somewhat differently, if each of the weighting units W is set at some arbitrarily chosen conductance setting and potentiometer 44 is set at its appropriate setting corresponding to $$\sqrt{W_0^2 + W_1^2 + W_2^2 + \ldots W_n^2}$$

the output voltage of the differential amplifier 40 will be a maximum when a direct match exists between each of the analog voltage levels $V_{Dn}$ and the corresponding weight $W_n$. In addition, any known record whose parameters correspond to the respective parameters of the unknown in the same proportion will also cause the differential amplifier to supply a maximum voltage since the input voltages are equal.

Figure 5:
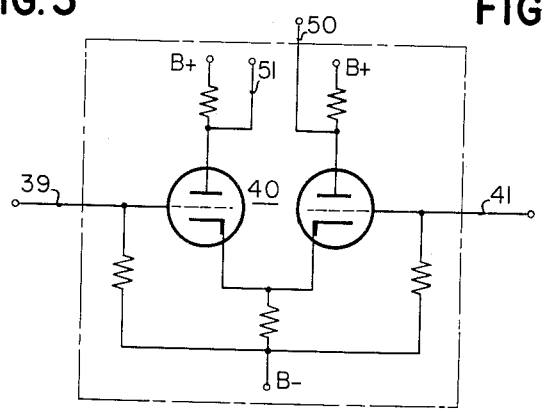

As mentioned previously, one terminal 39 of the differential amplifier is supplied with a voltage $V_{DWS}$ which is proportional to the numerator of Equation 1, while the other terminal 41 is supplied with a weighted control voltage $V_{WC}$ proportional to the denominator of Equation 1. The differential amplifier as shown schematically in FIG. 5 has a pair of output terminals 50 and 51. Terminal 50 is at a maximum value when the input signals are equal and terminal 51 is at a minimum value when the signals are equal. Terminal 50 is connected to a suitable level sensing unit 53, such as a Schmitt trigger, through a gating unit 55. Unit 53 generates an indicating signal IS under control of a $CO_{100}$ pulse from counter 19 when the voltage of terminal 50 exceeds a predetermined level.

The indicating signal IS generated by the level sensing unit 53 may be employed to control the entry of information concerning the identity of the record being compared to a print unit 60. Information as to the identity of the record is stored in channel C6 of the tape 11 in bit spaces $b_{20}$ through $b_{40}$ (not shown). Transducer T6, adapted to scan channel C6 of the tape, is connected to the identity storage unit 61 through a gate unit 62 which is opened in response to a signal $CO_{20}$ from the counter and closed by a signal $CO_{40}$ from the counter. The identity of each record scanned is therefore entered into the identity storage unit 61. The identity storage unit 61 is connected to a print unit 60 through a gate unit 64 which is operated under control of the indicating signal IS. The identity of a scanned record which causes an indicating signal IS is therefore printed out by the print unit 60.

In order to search for records which have a predetermined degree of correspondence to the unknown, a percentage matched potentiometer 66 is inserted between the input terminal 41 of the differential amplifier 40 and the output terminal of the weighting potentiometer 44. Potentiometer 66 serves the function of the factor K in Equation 1 by further weighting the voltage $V_{WC}$ from potentiometer 44. For example, if potentiometer 66 is set at an 80 percent position, each voltage $V_{WC}$ supplied to terminal 41 of the differential amplifier 40 is decreased by a factor of 20 percent. As a result any record which previously provided a voltage $V_{DWS}$ which was 80% or more of the voltage obtained at $V_{WC}$ when there is a 1–1 correspondence would now cause the differential amplifier 40 to operate the level sensing unit 53 since the input voltage at 39 is equal to or greater than the voltage at input 41.

Assuming a library of records of known elements has been established and is recorded on tape 11, each record comprising 100 binary coded digital representations corresponding to the descriptors D employed to define the element, together with other control data on channels 5 and 6, and assuming further a spectrum of an unknown element has been obtained, the operation of the system is substantially as follows. The unknown spectrum is first defined in terms of the 100 parameters on which the records in the library are based. The weighting units $W_0$ through $W_{99}$ are then set to the appropriate setting from 0 to 15 corresponding, respectively, to the values of the 100 parameters of the unknown element. The factor $$\sqrt{W_0^2 + W_1^2 + W_2^2 + \ldots W_n^2}$$

is calculated and potentiometer 44 set at the appropriate position from 0 to 150 corresponding to this factor. The percentage match means 66 is adjusted to the desired degree of correspondence which will be assumed to be 100 percent in the present example.

As the tape 11 moves past the read station 13, each binary coded digital representation of the 100 descriptors $D_0$ through $D_{99}$ is converted to 100 corresponding analog voltage levels $V_{D0}$ through $V_{D99}$ by the digital-to-analog converting means 15, transducer CL suppling clock pulses to counter 19 which supplies CO pulses to gating units $G_0$ through $G_{99}$ in succession. Each voltage $V_{Dn}$ is then weighted by the associated weighting unit $W_n$ to provide the weighted voltage $V_{DWn}$. The sum of the 100 weighted voltages $V_{DW0}$ through $V_{DW99}$ is supplied to terminal 39 of the differential amplifier 40 as voltage $V_{DWS}$. As mentioned previously, this voltage corresponds to the numerator of Equation 1.

Simultaneosuly as the descriptors $D_1$ through $D_{99}$ are being converted to weighted analog voltages, transducer T6 supplies binary representations of the factor $$\sqrt{D_0^2 + D_1^2 + D_2^2 + \ldots D_n^2}$$

(recorded on channel 6 from bit spaces $b_0$ through $b_7$ for each record) to converter means 43 which generates the analog control voltage $V_C$. Voltage $V_C$ is supplied to potentiometer 44 which weights this voltage by a factor proportional to $$\sqrt{W_0^2 + W_1^2 + W_2^2 + \ldots W_n^2}$$

and hence develops voltage $V_{WC}$ proportional to the denominator of Equation 1. Likewise, transducer T6 supplies the identity of each record scanned (as recorded on channel 6 in bit spaces $b_{20}$ through $b_{40}$ of the record) to the identity storage unit 61 through the gate unit 62 under the control of counter pulses $CO_{20}$ and $CO_{40}$.

The output voltage of the differential amplifier 40 is indirectly proportional to the difference between voltage $V_{DWS}$ and $V_{WC}$ and is a maximum when the voltages are equal which occurs, for example, when the 100 parameters of the spectrum of the unknown, as represented by the weights $W_0$ through $W_{99}$, are in correspondence with the respective 100 parameters of a known element in the library or, in other words, where the spectra of the two elements have the same wave shape.

The output voltage of the differential amplifier 40 is sampled immediately after each record is scanned by means of a $CO_{100}$ pulse from the counter 19 via the gate unit 55. Assuming the percentage match potentiometer 66 was adjusted for 100 percent correspondence, the indicating signal IS is generated when the two input signals $V_{DWS}$ and $V_{WC}$ are equal and the identity of the record, as stored in the identity storage unit 61, is caused to be printed by the print unit 60. The $CO_{100}$ pulse also resets all the registers at the end of each record.

If the percentage match potentiometer 66 is set at a value less than 100 percent, say 80 percent, the voltage $V_{WC}$ produced by some records which are more than 80 percent close to the unknown will be smaller than the corresponding voltage $V_{DWS}$. The maximum output voltage of the differential amplifier previously obtained for a setting of 100 percent will of course be increased. However, the operating level of sensing device 53 remains constant. The system can readily operate at a 10,000 k.c. rate. Assuming a library of 10,000 records, each having 100 parameters, a single scan through the library would consume something less than two minutes.

An important feature of the present system arises from the fact that in addition to a particular setting of the 100 weighting units providing a maximum voltage for a direct match, other records will provide voltages which are predetermined percentages of the maximum voltage in accordance with how closely they resemble the unknown element. It is therefore possible to adjust the setting of percentage match potentiometer so that the identity of all records which provide a voltage which is, for example 90 percent of this maximum voltage will therefore be printed out by print unit 69 during a single scan through the library.

In the illustrated embodiment many of the circuit components which per se are old in the art have been shown in block diagram in that their specific details form no part of the present invention. Hence, these components are described and explained merely in terms of their function since reference may be had to many standard texts for operational details of specific circuits capable of performing the recited function.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A system for comparing an unknown item of information defined by a plurality of parameters with a library of known items defined by similar parameters to determine those items which have a predetermined degree of similarity to the unknown item comprising in combination, means for storing binary coded digital representations of the numerical amplitude of said parameters of said known items, means for converting each said stored digital representation to a corresponding analog voltage level, a plurality of units coupled to said converting means for weighting each said analog voltage level by a predetermined weight selected in accordance with the corresponding parameter of said unknown item to provide a plurality of weighted voltages, means connecting the output of said weighting units in parallel to sum said weighted voltages, means for generating a control voltage for each stored item proportional to the square root of the sum of the squares of said numerical amplitude of said parameters defining said item, means connected to said generating means for weighting said control voltage by a conductance factor proportional to the square root of the sum of the squares of said predetermined weights to provide a weighted control voltage, a voltage comparing means having a pair of input terminals and an output terminal for providing an indicating signal only when the voltage applied to one terminal is equal to or greater than the voltage applied to the other terminal, means for supplying said summed voltage to one of said terminals, and means for supplying said weighted control voltage to the other of said terminals whereby an indicating signal is provided when the unknown item has a predetermined degree of correspondence with known items in the library.

2. The invention recited in claim 1 in which auxiliary weighting means are connected between said converting means and said comparing means for reducing said weighted control voltage in accordance with the degree of correspondence desired between said unknown item and said known items.

3. The invention recited in claim 1 in which said storing means comprises a magnetic tape.

4. The invention recited in claim 1 in which said converting means comprises a plurality of magnetic transducers, a plurality of digital to analog converters and an electronic distributor for connecting said transducers to each of said converters in succession.

5. The invention recited in claim 1 in which each said weighting unit comprises a potentiometer having a plurality of taps corresponding to predetermined conductance settings and a contact movable to a selected one of said taps.

6. The invention recited in claim 1 in which said control voltage generating means comprises means for storing a binary coded digital representation of said control voltage, a digital to analog converter, and transducer means responsive to said control voltage representations for supplying signals to said converter.

7. The invention recited in claim 1 further comprising means for temporarily storing the identity of each known item being compared, and means under control of said indicating signal for providing a printed record of each item which has said predetermined degree of correspondence.

References Cited in the file of this patent

UNITED STATES PATENTS

| | | |
|---|---|---|
| 2,671,608 | Hirsch | Mar. 9, 1954 |
| 2,798,216 | Goldberg et al. | July 2, 1957 |
| 2,799,222 | Goldberg et al. | July 16, 1957 |

OTHER REFERENCES

Klein et al.: Instruments and Automation, April 1956, pp. 695–697. (Copy in Div. 23.)